(12) United States Patent
Kuroda et al.

(10) Patent No.: US 10,075,091 B2
(45) Date of Patent: Sep. 11, 2018

(54) POWER CONVERTER

(71) Applicant: MITSUBISHI ELECTRIC CORPORATION, Chiyoda-ku, Tokyo (JP)

(72) Inventors: Kenichi Kuroda, Tokyo (JP); Ryosuke Uda, Tokyo (JP); Masashi Kitayama, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/566,249

(22) PCT Filed: Apr. 24, 2015

(86) PCT No.: PCT/JP2015/062490
§ 371 (c)(1),
(2) Date: Oct. 13, 2017

(87) PCT Pub. No.: WO2016/170672
PCT Pub. Date: Oct. 27, 2016

(65) Prior Publication Data
US 2018/0109200 A1  Apr. 19, 2018

(51) Int. Cl.
*H02M 7/23* (2006.01)
*H02M 7/497* (2007.01)
(Continued)

(52) U.S. Cl.
CPC ............. *H02M 7/23* (2013.01); *H02M 1/32* (2013.01); *H02M 7/155* (2013.01); *H02M 7/497* (2013.01);
(Continued)

(58) Field of Classification Search
CPC ........ H02M 7/23; H02M 7/537; H02M 7/155; H02M 1/32; H02M 7/497; H02M 2001/0006; H02M 2001/0009
(Continued)

(56) References Cited

U.S. PATENT DOCUMENTS 5,081,367 A * 1/1992 Smith ..................... H02J 9/062
                                                                    307/64
5,576,580 A * 11/1996 Hosoda ................. H02H 3/025
                                                                    307/11
(Continued)

FOREIGN PATENT DOCUMENTS

EP        3 107 172 A1    12/2016
JP       2001-268929 A    9/2001
(Continued)

OTHER PUBLICATIONS

Received STIC search report from EIC 2800 searcher John Digeronimo dated Apr. 3, 2018 and dated Apr. 5, 2018.*
(Continued)

*Primary Examiner* — Timothy J Dole
*Assistant Examiner* — Htet Z Kyaw
(74) *Attorney, Agent, or Firm* — Buchanan Ingersoll & Rooney PC

(57) ABSTRACT

In a multilevel converter, three circuit breakers are respectively connected between three arms and three reactors. One circuit breaker is a DC circuit breaker configured to interrupt direct current when a short circuit accident occurs between two DC power transmission lines. Each of the two circuit breakers is an AC circuit breaker configured to interrupt alternating current when the short circuit accident occurs. When the short circuit accident occurs, the two AC circuit breakers are brought into the non-conductive state and then
(Continued)

the DC circuit breaker is brought into the non-conductive state, thereby interrupting the short circuit current.

13 Claims, 14 Drawing Sheets

(51) Int. Cl.
    *H02M 1/32*     (2007.01)
    *H02M 7/155*     (2006.01)
    *H02M 7/537*     (2006.01)
    *H02M 1/00*     (2006.01)

(52) U.S. Cl.
    CPC .... *H02M 7/537* (2013.01); *H02M 2001/0006* (2013.01); *H02M 2001/0009* (2013.01)

(58) Field of Classification Search
    USPC .......................................................... 363/65
    See application file for complete search history.

(56) References Cited

U.S. PATENT DOCUMENTS

| | | | |
|---|---|---|---|
| 8,614,904 B2* | 12/2013 | Norrga | H02M 7/483 363/127 |
| 9,722,507 B2* | 8/2017 | Nakazawa | H02M 7/06 |
| 9,800,171 B2* | 10/2017 | Tahata | H02M 7/155 |
| 2012/0087049 A1* | 4/2012 | Komatsu | H02H 7/1216 361/20 |
| 2018/0076735 A1* | 3/2018 | Bakran | H02M 7/49 |

FOREIGN PATENT DOCUMENTS

| | | |
|---|---|---|
| JP | 2012-228025 A | 11/2012 |
| JP | 5622978 B1 | 11/2014 |

OTHER PUBLICATIONS

Notice of Grounds of Rejection for Japanese Patent Application No. 2015-545226, dated Dec. 15, 2015.

International Search Report (PCT/ISA/210) dated Jul. 14, 2015, by the Japanese Patent Office as the International Searching Authority for International Application No. PCT/JP2015/062490.

Written Opinion (PCT/ISA/237) dated Jul. 14, 2015, by the Japanese Patent Office as the International Searching Authority for International Application No. PCT/JP2015/062490.

* cited by examiner (a) ON STATE (b) OFF STATE (a) $\omega t = 0 \sim \frac{\pi}{2}$ (c) $\omega t = \frac{\pi}{2} \sim \pi$ (b)

(d)

(a) $\omega t = \pi \sim \frac{3\pi}{2}$ (c) $\omega t = \frac{3\pi}{2} \sim 2\pi$ (b)

(d)

POWER CONVERTER

TECHNICAL FIELD

The present invention relates to a power converter, particularly, a power converter configured to transmit and receive power between AC and DC.

BACKGROUND ART

A half bridge type modular multilevel converter, which is a conventional power converter, includes three phase modules connected in parallel between a positive voltage terminal and a negative voltage terminal. Each of the phase modules includes: a first arm connected between the positive voltage terminal and an AC terminal; and a second arm connected between the AC terminal and the negative voltage terminal, each of the first and second arms including a plurality of unit cells connected in cascade.

Each of the unit cells includes: a capacitor configured to be charged to a DC voltage; first and second switching elements connected in series between positive electrode and negative electrode of the capacitor; and first and second diodes respectively connected to the first and second switching elements in antiparallel. In each of the arms, the second switching elements of the plurality of unit cells are connected in series. By controlling the plurality of unit cells in each of the arms, one of DC power and three-phase AC power can be converted into the other of the DC power and the three-phase AC power (for example, see Patent Document 1 (Japanese Patent Laying-Open No. 2012-228025)).

CITATION LIST

Patent Document

PTD 1: Japanese Patent Laying-Open No. 2012-228025

SUMMARY OF INVENTION

Technical Problem

When a short circuit accident occurs in a DC power transmission line in a DC power transmission system including such a multilevel converter, large line direct current flows in the first or second switching element of each unit cell (see FIG. 11).

The first and second switching elements of each unit cell can be protected by interrupting the first and second switching elements upon the occurrence of the short circuit accident; however, the line direct current continues to flow in the second diode of each unit cell. Accordingly, a technique of protecting the second diode is required.

As the technique of protecting the second diode, the following procedure is considered: when a short circuit accident occurs, the first and second switching elements are brought into the non-conductive state and a mechanical bypass switch, connected to the second diode in parallel, is brought into the conductive state before the second diode is damaged by the line direct current. According to this procedure, the line direct current is transferred to the mechanical bypass switch, thereby protecting the first and second switching elements and the second diode.

However, when the mechanical bypass switches of all the unit cells are brought into the conductive state, each of the three phase modules is brought into the conductive state, with the result that three-phase short circuit current flows (see FIG. 12) and inter-arm direct current starts to circulate in a path including two groups each constituted of first and second arms (see FIG. 13). In order to recover the DC power transmission system immediately from the short circuit accident, the short circuit current including the three-phase short circuit current, the line direct current, and the inter-arm direct current needs to be removed immediately.

Accordingly, the present invention has a main object to provide a power converter capable of quickly interrupting short circuit current generated upon a short circuit accident.

Solution to Problem

A power converter according to the present invention includes: first and second DC terminals each configured to transmit and receive DC power, the first DC terminal being connected to a first DC power transmission line, the second DC terminal being connected to a second DC power transmission line; and a plurality of phase modules connected in parallel between the first and second DC terminals. Each of the phase modules includes: an AC terminal configured to transmit and receive AC power; a first arm connected between the first DC terminal and the AC terminal; a second arm connected between the AC terminal and the second DC terminal; and a circuit breaker connected between the first and second DC terminals in series with the first and second arms, the circuit breaker being configured to be in a conductive state during a normal operation, the circuit breaker being configured to be brought into a non-conductive state when a short circuit accident occurs between the first and second DC power transmission lines. Each of the first and second arms includes a plurality of unit cells connected in cascade. Each of the unit cells includes a voltage source, first and second switching elements, and first and second diodes, the first and second switching elements being connected in series between electrodes of the voltage source, the first and second diodes being respectively connected to the first and second switching elements in antiparallel. Each of the first and second arms further includes at least one bypass switch. The at least one bypass switch is configured to be brought into the conductive state when the short circuit accident occurs, so as to bypass the first or second diode of each unit cell of a corresponding arm. One of the plurality of circuit breakers is a DC circuit breaker configured to interrupt direct current when the short circuit accident occurs, and each of the other circuit breakers is an AC circuit breaker configured to interrupt alternating current when the short circuit accident occurs.

Advantageous Effects of Invention

In accordance with the power converter according to the present invention, when a short circuit accident occurs, short circuit current can be quickly interrupted by bringing each AC circuit breaker into the non-conductive state and then bringing the DC circuit breaker into the non-conductive state.

DESCRIPTION OF EMBODIMENTS

Figure 1:
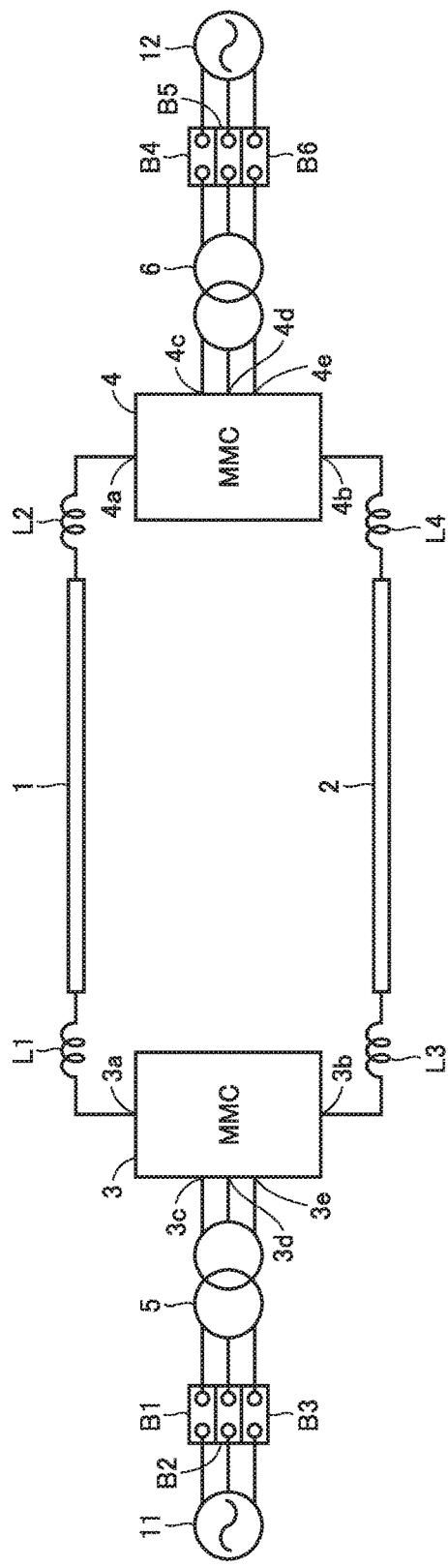
FIG. 1 is a circuit block diagram showing a configuration of a DC power transmission system according to one embodiment of the present invention.

FIG. 1 is a circuit block diagram showing a configuration of a DC power transmission system according to one embodiment of the present invention. In FIG. 1, the DC power transmission system includes DC power transmission lines 1, 2, circuit breakers B1 to B6, reactors L1 to L4, half bridge type modular multilevel converters (MMC) 3, 4, three-phase transformers 5, 6, and AC power systems 11, 12.

Multilevel converter 3 is a bidirectional power converter including a positive voltage terminal 3a (first DC terminal), a negative voltage terminal 3b (second DC terminal), and three AC terminals 3c to 3e, and is configured to convert one of DC power and three-phase AC power into the other of the DC power and the three-phase AC power. Positive voltage terminal 3a and negative voltage terminal 3b are used to transmit and receive the DC power, and three AC terminals 3c to 3e are used to transmit and receive the three-phase AC power.

In other words, multilevel converter 3 has an AC/DC conversion mode (first power conversion mode) and a DC/AC conversion mode (second power conversion mode). In the AC/DC conversion mode, multilevel converter 3 converts the three-phase AC power provided to AC terminals 3c to 3e into DC power, and outputs the DC power to positive voltage terminal 3a and negative voltage terminal 3b. In the DC/AC conversion mode, multilevel converter 3 converts the DC power provided to positive voltage terminal 3a and negative voltage terminal 3b into three-phase AC power, and outputs the three-phase AC power to AC terminals 3c to 3e.

Multilevel converter 4 is a bidirectional power converter including a positive voltage terminal 4a, a negative voltage terminal 4b, and three AC terminals 4c to 4e, and is configured to convert one of DC power and three-phase AC power into the other of the DC power and the three-phase AC power. Positive voltage terminal 4a and negative voltage terminal 4b are used to transmit and receive the DC power, and three AC terminals 4c to 4e are used to transmit and receive the three-phase AC power.

In other words, multilevel converter 4 has an AC/DC conversion mode and a DC/AC conversion mode. In the AC/DC conversion mode, multilevel converter 4 converts the three-phase AC power provided to AC terminals 4c to 4e into DC power, and outputs the DC power to positive voltage terminal 4a and negative voltage terminal 4b. In the DC/AC conversion mode, multilevel converter 4 converts the DC power provided to positive voltage terminal 4a and negative voltage terminal 4b into three-phase AC power, and outputs the three-phase AC power to AC terminals 4c to 4e.

DC power transmission line 1 has one end connected to positive voltage terminal 3a of multilevel converter 3 via reactor L1, and has the other end connected to positive voltage terminal 4a of multilevel converter 4 via reactor L2. DC power transmission line 2 has one end connected to negative voltage terminal 3b of multilevel converter 3 via reactor L3, and has the other end connected to negative voltage terminal 4b of multilevel converter 4 via reactor L4.

Each of DC power transmission lines 1, 2 is used to transmit DC power. Reactors L1, L3 are configured to suppress a signal, which is generated in multilevel converter 3 and has a switching frequency, from flowing to DC power transmission lines 1, 2. Reactors L2, L4 are configured to suppress a signal, which is generated in multilevel converter 4 and has a switching frequency, from flowing to DC power transmission lines 1, 2.

Three AC terminals 3c to 3e of multilevel converter 3 are connected to respective three secondary side terminals of three-phase transformer 5. Three-phase transformer 5 has three primary side terminals connected to respective three-phase power transmission lines of AC power system 11 via circuit breakers B1 to B3.

Three AC terminals 4c to 4e of multilevel converter 4 are connected to respective three secondary side terminals of three-phase transformer 6. Three-phase transformer 6 has three primary side terminals connected to respective three-phase power transmission lines of AC power system 12 via circuit breakers B4 to B6.

Three-phase transformer 5 transmits and receives the three-phase AC power between multilevel converter 3 and AC power system 11. Three-phase transformer 6 transmits and receives the three-phase AC power between multilevel converter 4 and AC power system 12. During a normal operation, circuit breakers B1 to B6 are in the conductive state. Circuit breakers B1 to B6 are brought into the non-conductive state for maintenance of multilevel converters 3, 4 and three-phase transformers 5, 6, for example.

Next, the following describes an operation of the DC power transmission system. When supplying three-phase AC power from AC power system 11 to AC power system 12, three-phase AC power of AC power system 11 is supplied to multilevel converter 3 via circuit breakers B1 to B3 and three-phase transformer 5 and is converted into DC power in multilevel converter 3. The DC power thus generated in multilevel converter 3 is supplied to multilevel converter 4 via DC power transmission lines 1, 2 and the like, and is converted into three-phase AC power in multilevel converter 4. The three-phase AC power generated in multilevel converter 4 is supplied to AC power system 12 via three-phase transformer 6 and circuit breakers B4 to B6.

On this occasion, a DC voltage between terminals 3a, 3b of multilevel converter 3 is set at a voltage slightly larger than a DC voltage between terminals 4a, 4b of multilevel converter 4, and the DC power is supplied from multilevel converter 3 to multilevel converter 4 via DC power transmission lines 1, 2 and the like.

Multilevel converter 3 operates as an AC/DC converter configured to convert the AC power, supplied from the AC power supply (AC power system 11, circuit breakers B1 to B3, and three-phase transformer 5), into DC power. Multilevel converter 4 operates as a DC/AC converter configured to convert the DC power, supplied from the DC power supply (multilevel converter 3 and the like), into AC power.

On the other hand, when supplying three-phase AC power from AC power system 12 to AC power system 11, three-phase AC power of AC power system 12 is supplied to multilevel converter 4 via circuit breakers B4 to B6 and three-phase transformer 6 and is converted into DC power in multilevel converter 4. The DC power thus generated in multilevel converter 4 is supplied to multilevel converter 3 via DC power transmission lines 1, 2 and the like, and is converted into three-phase AC power in multilevel converter 3. The three-phase AC power generated in multilevel converter 3 is supplied to AC power system 11 via three-phase transformer 5 and circuit breakers B1 to B3.

On this occasion, a DC voltage between terminals 4a, 4b of multilevel converter 4 is set at a voltage slightly larger than a DC voltage between terminals 3a, 3b of multilevel converter 3, and the DC power is supplied from multilevel converter 4 to multilevel converter 3 via DC power transmission lines 1, 2 and the like.

Multilevel converter 4 operates as an AC/DC converter configured to convert the AC power, supplied from the AC power supply (AC power system 12, circuit breakers B4 to B6, and three-phase transformer 6), into DC power. Multilevel converter 3 operates as a DC/AC converter configured to convert the DC power, supplied from the DC power supply (multilevel converter 4 and the like), into AC power. When a short circuit accident occurs between DC power transmission lines 1, 2, the operations of multilevel converters 3, 4 are stopped, thereby protecting the DC power transmission system.

Figure 2:
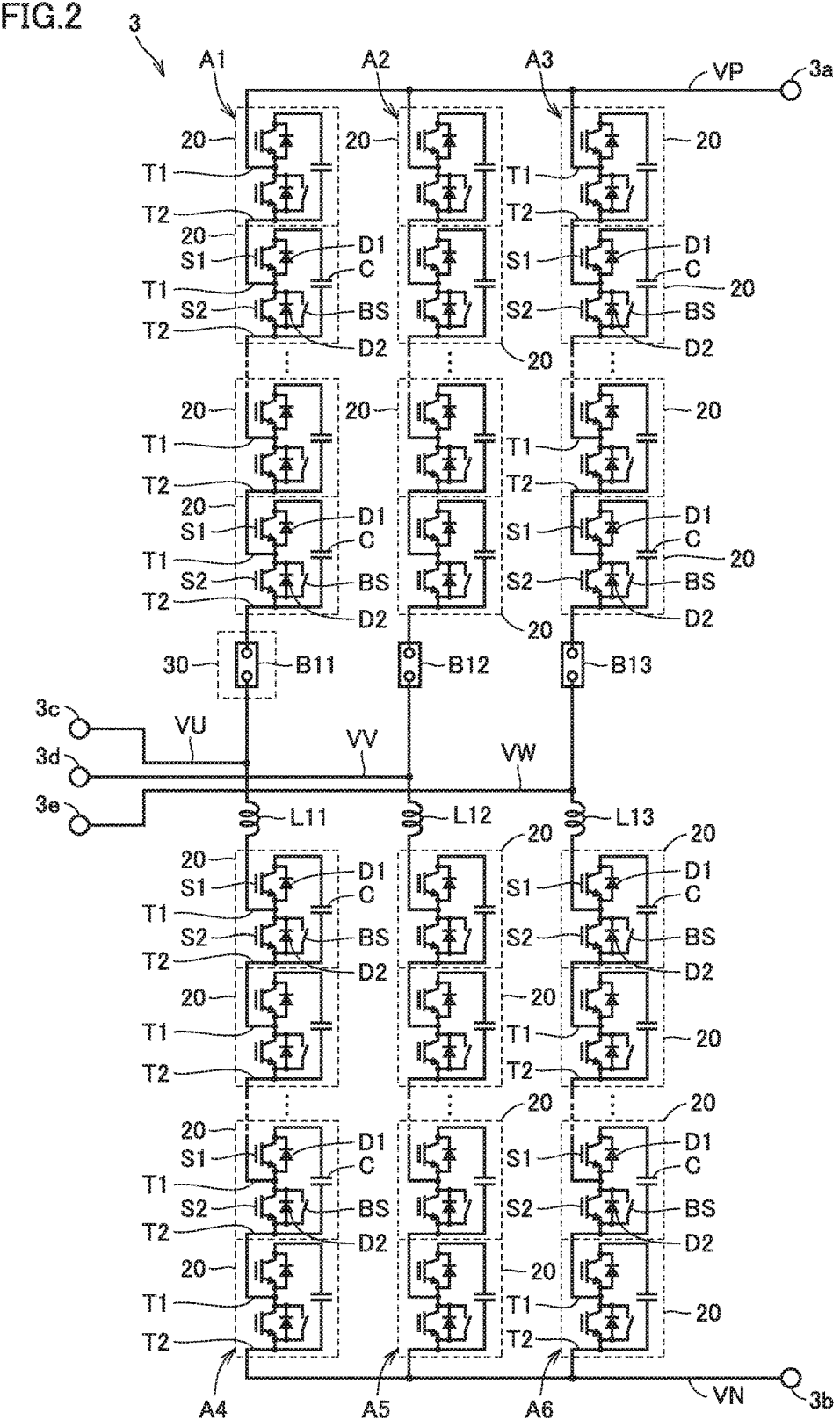
FIG. 2 is a circuit diagram showing a major portion of a multilevel converter shown in FIG. 1.

FIG. 2 is a circuit diagram showing a major portion of multilevel converter 3. In FIG. 2, multilevel converter 3 includes positive voltage terminal 3a, negative voltage terminal 3b, AC terminals 3c to 3e, arms A1 to A6, a DC interruption device 30, circuit breakers B12, B13, and reactors L11 to L13. DC interruption device 30 includes a circuit breaker B11. AC terminal 3c, arms A1, A4, circuit breaker B11, and reactor L11 constitute a U-phase module. AC terminal 3d, arms A2, A5, circuit breaker B12, and reactor L12 constitute a V-phase module. AC terminal 3e, arms A3, A6, circuit breaker B13, and reactor L13 constitute a W-phase module.

Positive voltage terminal 3a is supplied with a positive DC voltage VP from multilevel converter 4. Negative voltage terminal 3b is supplied with a negative DC voltage VN from multilevel converter 4. AC terminal 3c is supplied with a U-phase AC voltage VU from three-phase transformer 5 and multilevel converter 3. AC terminal 3d is supplied with a V-phase AC voltage VV from three-phase transformer 5 and multilevel converter 3. AC terminal 3e is supplied with a W-phase AC voltage VW from three-phase transformer 5 and multilevel converter 3. The phases of three-phase AC voltages VU, VV, VW are shifted by 120°.

Arm A1 and circuit breaker B11 are connected in series between positive voltage terminal 3a and AC terminal 3c. Arm A2 and circuit breaker B12 are connected in series between positive voltage terminal 3a and AC terminal 3d. Arm A3 and circuit breaker B13 are connected in series between positive voltage terminal 3a and AC terminal 3e.

Circuit breaker B11 is used as a DC circuit breaker for interrupting direct current upon a short circuit accident, whereas each of circuit breakers B12, B13 is used as an AC circuit breaker for interrupting alternating current upon a short circuit accident. During the normal operation of multilevel converter 3, circuit breakers B11 to B13 are in the conductive state. When a short circuit accident occurs between DC power transmission lines 1, 2, circuit breakers B12, B13 are first brought into the non-conductive state to interrupt the three-phase short circuit current (alternating current), and then circuit breaker B11, which has the highest capability to interrupt direct current, is finally brought into the non-conductive state to interrupt remaining direct current. DC interruption device 30 including circuit breaker B11 will be described later.

Reactor L11 and arm A4 are connected in series between AC terminal 3c and negative voltage terminal 3b. Reactor L12 and arm A5 are connected in series between AC terminal 3d and negative voltage terminal 3b. Reactor L13 and arm A6 are connected in series between AC terminal 3e and negative voltage terminal 3b. Reactors L11 to L13 are configured to attenuate a signal having a switching frequency and generated in arms A1 to A6, and control the three-phase AC current flowing in arms A1 to A6.

Figure 3:
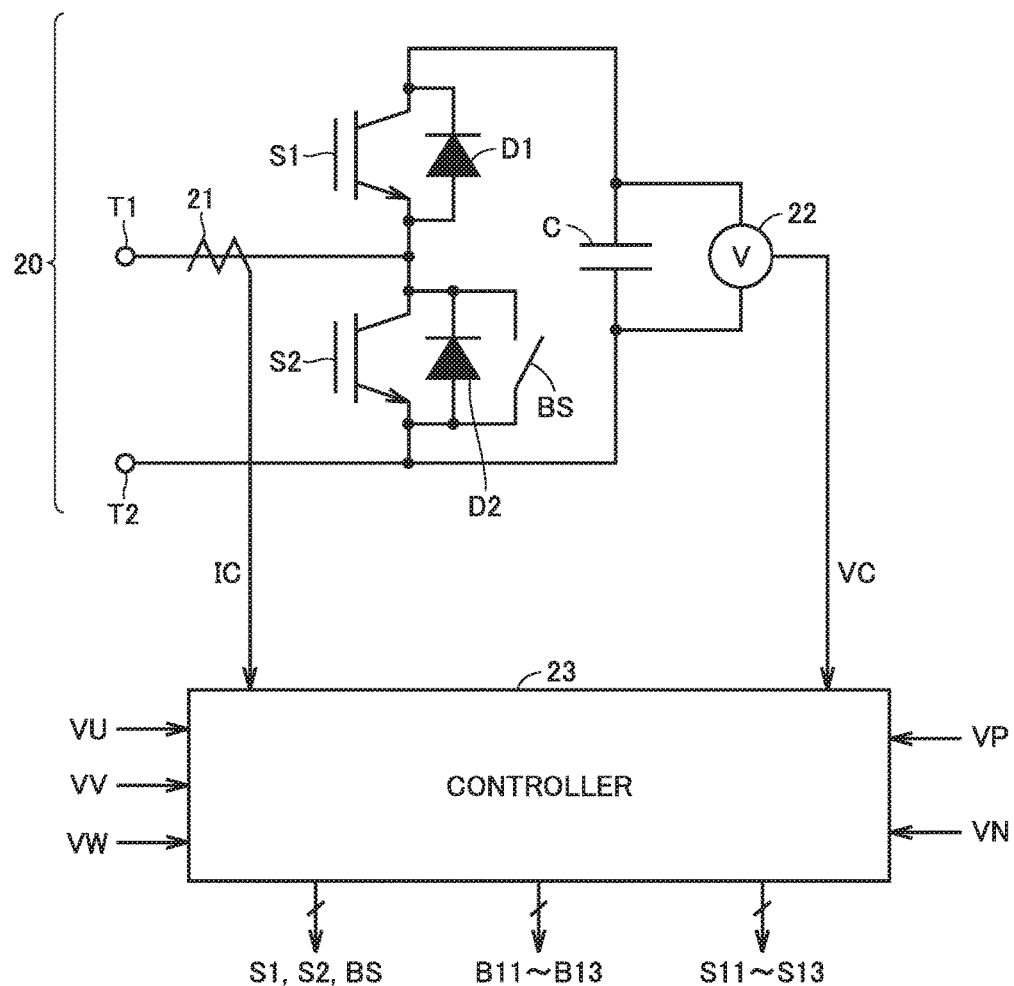
FIG. 3 is a circuit block diagram showing a configuration of a unit cell shown in FIG. 2 and a controller.

Each of arms A1 to A6 includes a plurality of unit cells 20 connected in cascade. As shown in FIG. 3, each of unit cells 20 includes a first terminal T1, a second terminal T2, a current detector 21, switching elements S1, S2, diodes D1, D2, a mechanical bypass switch BS, a capacitor C serving as a voltage source, and a voltage detector 22. Moreover, multilevel converter 3 includes a controller 23 configured to control all the unit cells 20, circuit breakers B11 to B13, switches S11 to S13, and the like. Switches S11 to S13 included in DC interruption device 30 will be described later.

Each of switching elements S1, S2 is constituted of an IGBT (Insulated Gate Bipolar Transistor), for example. Switching elements S1, S2 are connected in series between the positive and negative electrodes of capacitor C. That is, switching element S1 has a collector connected to the positive electrode of capacitor C and has an emitter connected to first terminal T1 and a collector of switching element S2, and switching element S2 has an emitter connected to second terminal T2 and the negative electrode of capacitor C.

Diodes D1, D2 are connected to switching elements S1, S2 in antiparallel, respectively. That is, diodes D1, D2 have anodes connected to the respective emitters of switching elements S1, S2, and have cathodes connected to the respective collectors of switching elements S1, S2. Each of diodes D1, D2 is a free wheel diode. Mechanical bypass switch BS is connected to diode D2 in parallel.

Current detector 21 detects an instantaneous value of current flowing between first terminal T1 and a node between switching elements S1, S2, and provides controller 23 with a signal indicating the detected value. Voltage detector 22 detects an instantaneous value of voltage VC between the electrodes of capacitor C, and provides controller 23 with a signal indicating the detected value.

As shown in FIG. 2, first terminals T1 of unit cells 20 of arms A1 to A3 at one end are connected to positive voltage terminal 3*a*. In each of arms A1 to A3, second terminals T2 of unit cells 20 are connected to first terminals T1 of unit cells 20 adjacent thereto in the direction of circuit breakers B11 to B13. Second terminals T2 of unit cells 20 of arms A1 to A3 at the other end are connected to respective terminals of circuit breakers B11 to B13 at one end.

First terminals T1 of unit cells 20 of arms A4 to A6 at one end are connected to respective terminals of reactors L11 to L13 at one end. In each of arms A4 to A6, second terminals T2 of unit cells 20 are connected to first terminals T1 of unit cells 20 adjacent thereto in the direction of negative voltage terminal 3*b*. Second terminals T2 of unit cells 20 of arms A4 to A5 at the other end are connected to negative voltage terminal 3*b*.

Controller 23 of FIG. 3 operates in synchronization with three-phase AC voltages VU, VV, VW from three-phase transformer 5, and controls switching elements S1, S2 of each unit cell 20 of arms A1 to A6 to convert the three-phase AC power from three-phase transformer 5 into DC power and supply it to DC power transmission lines 1, 2, or to convert the DC power from DC power transmission lines 1, 2 into three-phase AC power and supply it to three-phase transformer 5. On this occasion, controller 23 controls switching elements S1, S2 based on a result of detection by voltage detector 22 of each unit cell 20 to charge capacitor C of each unit cell 20 to a predetermined DC voltage.

Further, based on the result of detection by current detector 21 of each unit cell 20, controller 23 determines whether or not a short circuit accident has occurred in DC power transmission lines 1, 2. When the short circuit accident has occurred, controller 23 controls switching elements S1, S2 of each unit cell 20 to be brought into the non-conductive state. When switching elements S1, S2 are brought into the non-conductive state, the short circuit current flowing in switching element S2 is transferred to diode D2, thereby protecting switching elements S1, S2.

Next, controller 23 controls mechanical bypass switch BS to be brought into the conductive state. When mechanical bypass switch BS is brought into the conductive state, the short circuit current flowing in diode D2 is transferred to mechanical bypass switch BS, thereby protecting diode D2. When mechanical bypass switch BS is brought into the conductive state, arms A1 to A6 are brought into the conductive state, whereby three-phase short circuit current (see FIG. 12) and direct current (see FIG. 11 and FIG. 13) flow in arms A1 to A6. Controller 23 brings circuit breakers B12, B13 into the non-conductive state to interrupt the three-phase short circuit current, and then brings circuit breaker B11 into the non-conductive state to interrupt the direct current remaining in arms A1, A4.

Figure 4:
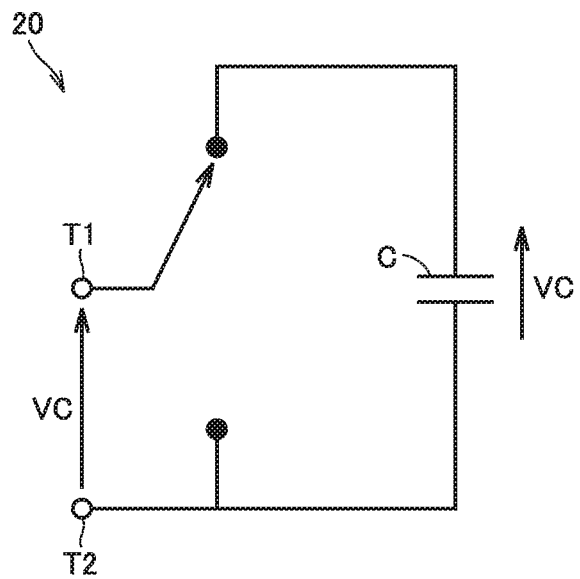
FIG. 4 is a circuit diagram showing an operation of the unit cell shown in FIG. 2.
Figure 4:
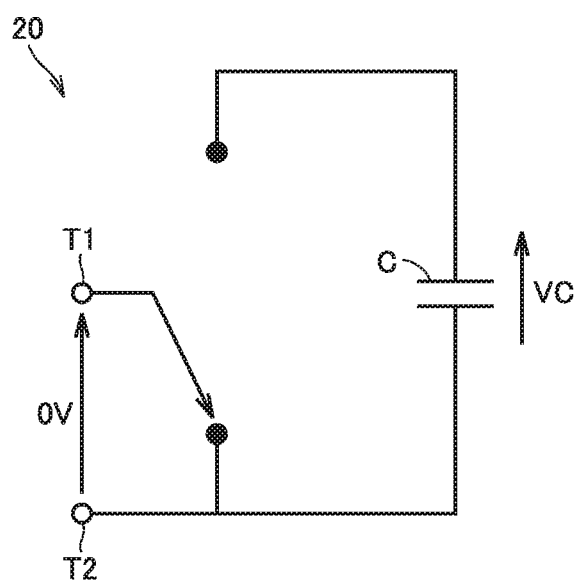

Next, the normal operation of multilevel converter 3 will be described. During the normal operation, each unit cell 20 is in the ON state or the OFF state. In unit cell 20 in the ON state, switching element S1 is in the conductive state and switching element S2 is in the non-conductive state, and terminals T1, T2 are respectively connected to the positive and negative electrodes of capacitor C as shown in FIG. 4 (*a*). When capacitor C has been charged to DC voltage VC, DC voltage VC is output between terminals T1, T2.

In unit cell 20 in the OFF state, switching element S1 is in the non-conductive state and switching element S2 is in the conductive state, and terminals T1, T2 are connected to each other and 0 V is output between terminals T1, T2 as shown in FIG. 4 (*b*). When capacitor C has been charged to DC voltage VC, the state is maintained.

Figure 5:
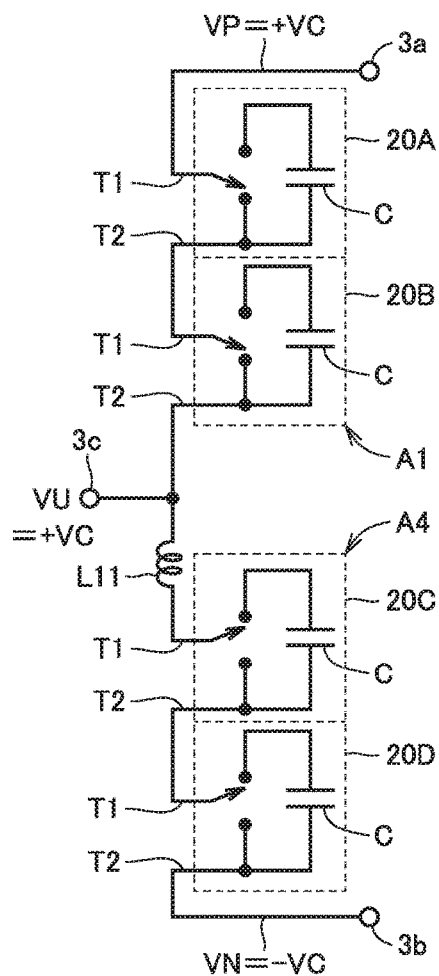
FIG. 5 is a diagram showing an operation of the multilevel converter shown in FIG. 2.
Figure 5:
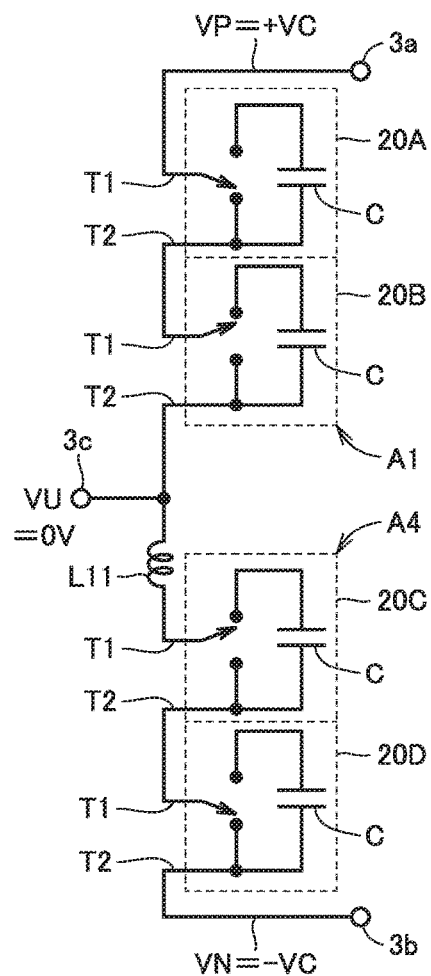
Figure 5:
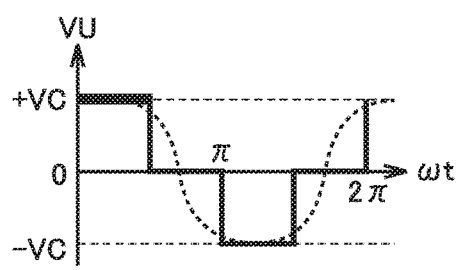
Figure 5:
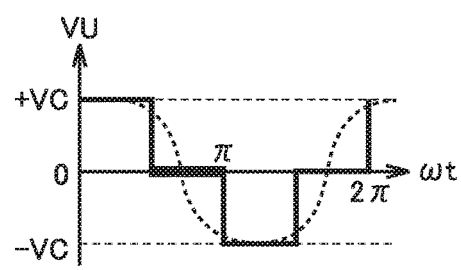
Figure 6:
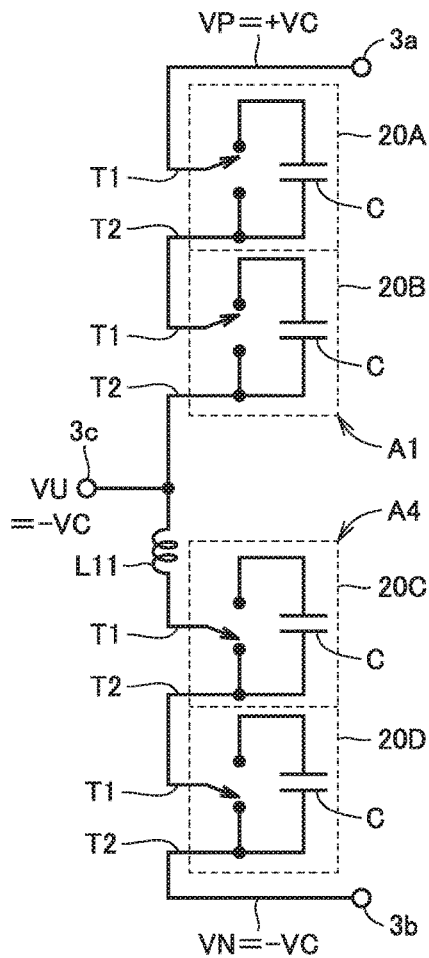
FIG. 6 is another diagram showing the operation of the multilevel converter shown in FIG. 2.
Figure 6:
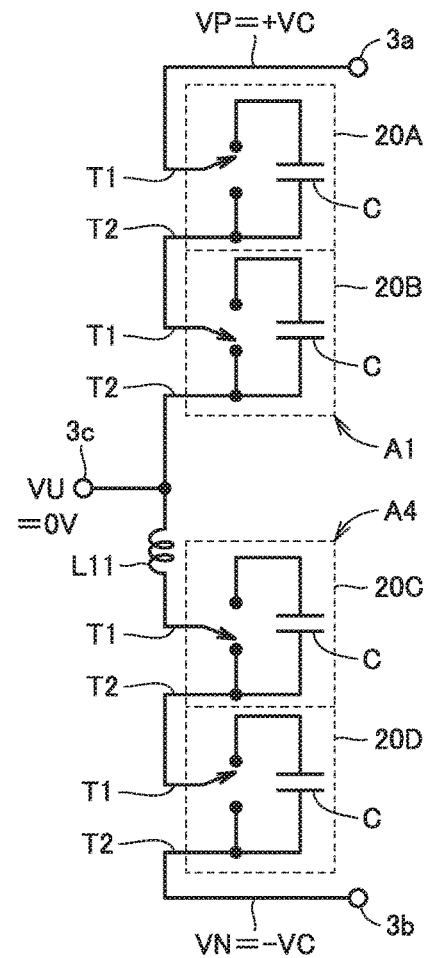
Figure 6:
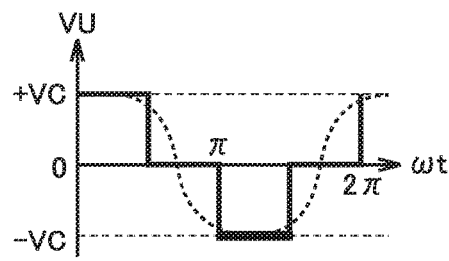
Figure 6:
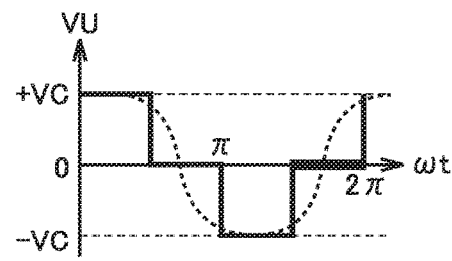

Each of FIGS. 5 (*a*) to (*d*) and FIGS. 6 (*a*) to (*d*) shows the normal operation of multilevel converter 3. Each of FIGS. 5 (*a*) to (*d*) and FIGS. 6 (*a*) to (*d*) only shows a part thereof in connection with U-phase AC voltage VU for simplification of the drawings and description. Arm A1 includes only two unit cells 20A, 20B, and arm A4 includes only two unit cells 20C, 20D. During the normal operation, circuit breaker B11 is in the conductive state, so that circuit breaker B11 is not illustrated in the figures.

It is assumed that capacitors C of unit cells 20A to 20D have been charged to predetermined DC voltage VC. Positive DC voltage VP=+VC is applied to positive voltage terminal 3*a*, and negative DC voltage VN=−VC is applied to negative voltage terminal 3*b*. Multilevel converter 3 outputs three-level AC voltage VU including +VC, 0 V, and −VC. It is assumed that AC voltage VU is represented by a function of ωt and that one period of AC voltage VU is 2π.

During a period from ωt=0 to (π/2), unit cells 20A, 20B are in the OFF state and unit cells 20C, 20D are in the ON state as shown in FIGS. 5 (*a*) and (*b*). Accordingly, DC voltage VP=+VC of positive voltage terminal 3*a* is output to AC terminal 3*c* via unit cells 20A, 20B, whereby voltage VU of AC terminal 3*c* becomes +VC. Between AC terminal 3*c* and negative voltage terminal 3*b*, reactor L11 and capacitors C of unit cells 20C, 20D are connected in series, whereby voltage VU of AC terminal 3*c* is maintained at +VC.

During a period from ωt=(π/2) to π, as shown in FIGS. 5 (*c*) and (*d*), unit cells 20A, 20D are in the OFF state and unit cells 20B, 20C are in the ON state. Accordingly, capacitor C of unit cell 20B is connected between positive voltage terminal 3*a* and AC terminal 3*c*, and reactor L11 and capacitor C of unit cell 20C are connected in series between AC terminal 3*c* and negative voltage terminal 3*b*, whereby voltage VU of AC terminal 3*c* becomes 0 V.

During a period from ωt=π to (3π/2), unit cells 20A, 20B are in the ON state and unit cells 20C, 20D are in the OFF state as shown in FIGS. 6 (*a*) and (*b*). Accordingly, DC voltage VN=−VC of negative voltage terminal 3*b* is output to AC terminal 3*c* via unit cells 20D, 20C and reactor L11, whereby voltage VU of AC terminal 3*c* becomes −VC. Capacitors C of unit cells 20A, 20B are connected between positive voltage terminal 3*a* and AC terminal 3*c*, whereby voltage VU of AC terminal 3*c* is maintained at −VC.

During a period from ωt=(3π/2) to 2π, unit cells 20A, 20D are in the ON state and unit cells 20B, 20C are in the OFF state as shown in FIGS. 6 (*c*) and (*d*). Accordingly, capacitor C of unit cell 20A is connected between positive voltage terminal 3*a* and AC terminal 3*c*, and reactor L11 and capacitor C of unit cell 20D are connected in series between AC terminal 3*c* and negative voltage terminal 3*b*, whereby voltage VU of AC terminal 3*c* becomes 0 V.

In this way, DC voltages VP=+VC and VN=−VC are converted into the three-level AC voltage VU. The waveform of AC voltage VU can be formed into a sinusoidal wave by increasing the number of unit cells 20 in each arm.

When the phases of three-phase AC voltages VU, VV, VW generated in multilevel converter 3 are advanced with respect to the phases of the three-phase AC voltage output from three-phase transformer 5, AC power having a value corresponding to a phase difference therebetween is supplied from multilevel converter 3 to three-phase transformer 5. In this case, multilevel converter 3 operates as a DC/AC converter configured to convert the DC power from DC power transmission lines 1, 2 into AC power and supply it to three-phase transformer 5.

On the other hand, when the phases of three-phase AC voltages VU, VV, VW generated in multilevel converter 3 are delayed with respect to the phases of the three-phase AC voltage output from three-phase transformer 5, AC power having a value corresponding to a phase difference therebetween is supplied from three-phase transformer 5 to multilevel converter 3. In this case, multilevel converter 3 operates as an AC/DC converter configured to convert the AC power from three-phase transformer 5 into DC power and supply it to DC power transmission lines 1, 2. The configuration and operation of multilevel converter 4 are the same as those of multilevel converter 3, and are therefore not described repeatedly.

Figure 7:
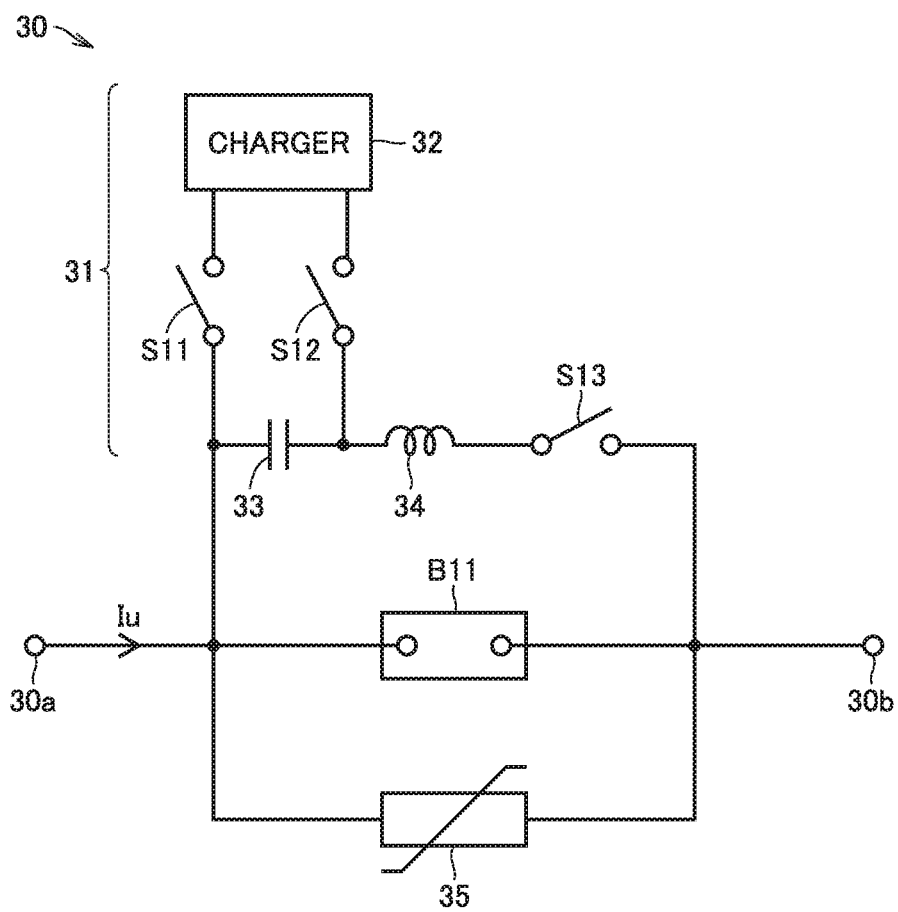
FIG. 7 is a circuit block diagram showing a configuration of a DC interruption device shown in FIG. 2.

FIG. 7 is a circuit block diagram showing a configuration of DC interruption device 30. In FIG. 7, DC interruption device 30 includes terminals 30a, 30b, circuit breaker B11, a reverse current generation circuit 31, and an energy absorption element 35. Circuit breaker B11 is connected between terminals 30a, 30b. Terminal 30a is connected to negative voltage terminal 3b via reactor L11 and arm A4, and terminal 30b is connected to positive voltage terminal 3a via arm A1.

Circuit breaker B11 includes first and second electrodes connected to terminals 30a, 30b, respectively. During the normal operation of multilevel converter 3, the state between the first and second electrodes of circuit breaker B11 is the closed state, so that circuit breaker B11 is in the conductive state. When a short circuit accident occurs between DC power transmission lines 1, 2, circuit breaker B11 is brought into the non-conductive state.

However, even when the state between the first and second electrodes of circuit breaker B11 is brought into the open state while large current is flowing in circuit breaker B11, arc is generated between the first and second electrodes, with the result that the current continues to flow between the first and second electrodes. Accordingly, circuit breaker B11 is not brought into the non-conductive state.

When alternating current is flowing in circuit breaker B11, the arc between the first and second electrodes is extinguished at a time (zero crossing point) at which the alternating current becomes 0 A. Accordingly, circuit breaker B11 is brought into the non-conductive state. When direct current is flowing in circuit breaker B11, current reverse to the direct current needs to be supplied to form the zero crossing point in order to extinguish the arc. Reverse current generation circuit 31 is a circuit configured to bring circuit breaker B11 into the non-conductive state by supplying circuit breaker B11 with the current reverse to the direct current.

That is, reverse current generation circuit 31 includes a charger 32, switches S11 to S13, a capacitor 33, and a reactor 34. Capacitor 33, reactor 34, and switch S13 are connected in series between terminals 30a, 30b. The first terminal (terminal 30a) of capacitor 33 is connected to the negative electrode of charger 32 via switch S11, and the second terminal of capacitor 33 is connected to the positive electrode of charger 32 via switch S12. Energy absorption element 35 is connected between terminals 30a, 30b.

During the charging operation, switches S11, S12 are on and switch S13 is off, whereby capacitor 33 is charged by charger 32 to a predetermined DC voltage. After the charging of capacitor 33 is ended, switches S11, S12 are turned off.

During the normal operation of multilevel converter 3, circuit breaker B11 is in the conductive state, so that U-phase current Iu flows between terminals 30a, 30b. When a short circuit accident occurs between DC power transmission lines 1, 2, the three-phase short circuit current (alternating current), the line direct current, and the inter-arm direct current flow in arms A1 to A6. When the three-phase short circuit current is flowing in arms A1 to A6, circuit breakers B12, B13 are brought into the non-conductive state. When the state between the first and second electrodes of each of circuit breakers B12, B13 is brought into the open state, the arc is extinguished at the zero crossing point of alternating current, whereby both circuit breakers B12, B13 are brought into the non-conductive state. Accordingly, the three-phase short circuit current is interrupted and the direct current flows in circuit breaker B11.

Next, when switch S13 is turned on, the current reverse to the direct current flows in a path from the first terminal of capacitor 33 to the second terminal of capacitor 33 via reactor 34, switch S13, and circuit breaker B11 and the zero crossing point is formed in the current flowing in circuit breaker B11, thereby extinguishing the arc between the first and second electrodes. After circuit breaker B11 is brought into the non-conductive state, overvoltage is generated between the first and second electrodes. Energy absorption element 35 absorbs electromagnetic energy between the first and second electrodes to attenuate the overvoltage. Accordingly, circuit breakers B11 to B13 are brought into the non-conductive state, thereby interrupting the short circuit current generated upon the short circuit accident.

Figure 8:
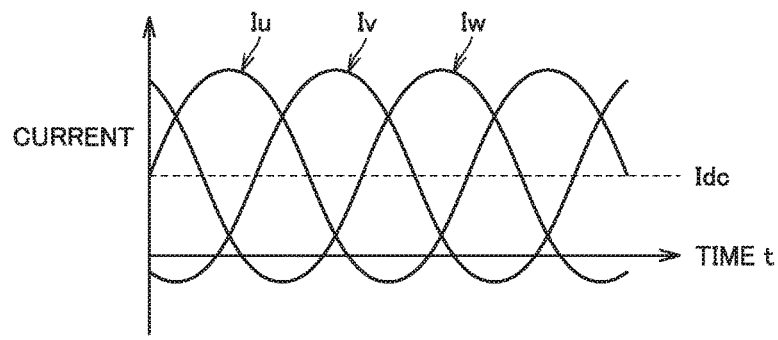
FIG. 8 is a time chart showing waveforms of currents flowing in arms A1 to A3 shown in FIG. 2 during a normal operation.

FIG. 8 is a time chart showing waveforms of currents Iu, Iv, Iw flowing in circuit breakers B11 to B13 during the normal operation of multilevel converter 3. U-phase current Iu is a current flowing from AC terminal 3c to positive voltage terminal 3a via circuit breaker B11 and arm A1. V-phase current Iv is a current flowing from AC terminal 3d to positive voltage terminal 3a via circuit breaker B12 and arm A2. W-phase current Iw is a current flowing from AC terminal 3e to positive voltage terminal 3a via circuit breaker B13 and arm A3.

As shown in FIG. 8, during the normal operation, the waveforms of currents Iu, Iv, Iw are the same and the phases of currents Iu, Iv, Iw are shifted by 120°. Each of currents Iu, Iv, Iw includes direct current Idc and alternating current that changes in the form of a sinusoidal wave. Direct current Idc is 300 A, for example. The alternating current has an amplitude of 350 A, for example.

Figure 9:
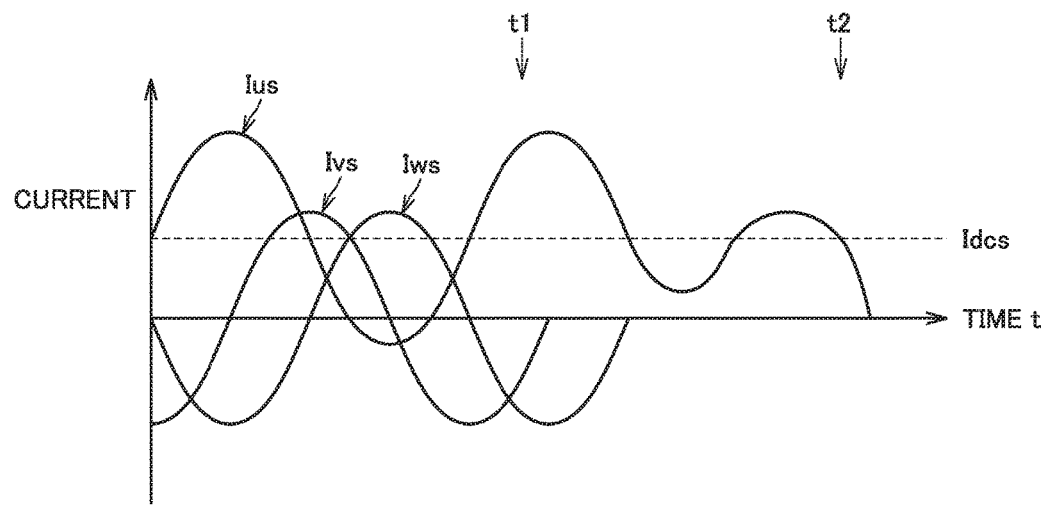
FIG. 9 is a time chart showing waveforms of currents flowing in arms A1 to A3 shown in FIG. 2 during a short circuit fault.

FIG. 9 is a time chart showing waveforms of currents Ius, Ivs, Iws flowing in circuit breakers B11 to B13 upon a short circuit accident. The paths and directions of flow of currents Ius, Ivs, Iws are the same as the respective paths and directions of currents Iu, Iv, Iw.

As shown in FIG. 9, upon a short circuit accident, three-phase short circuit current in the form of a sinusoidal wave flows in circuit breakers B11 to B13. The amplitudes of the alternating currents of currents Ius, Ivs, Iws are substantially the same and the phases of these alternating currents are shifted by 120°. Each of the alternating currents has an amplitude of 20 kA, for example.

Upon the short circuit accident, large direct current flows in one of the three phases. For simplification of the drawing and description, FIG. 9 shows a case where large direct current Idcs flows in the U phase. Direct current Idcs of current Ius is 15 kA, for example. The direct current of current Ivs is 1 kA, for example. The direct current of current Iws is 2 kA, for example.

When the state between the first and second electrodes of each of circuit breakers B12, B13 is brought into the open state at a certain time t1, arc is generated between the first and second electrodes, with the result that currents Ivs, Iws continue to flow. When current Ivs reaches the zero crossing point, the arc of circuit breaker B12 is extinguished, whereby circuit breaker B12 is brought into the non-conductive state and current Ivs becomes 0 A. Next, when current Iws reaches the zero crossing point, the arc of circuit breaker B13 is extinguished, whereby circuit breaker B13 is brought into the non-conductive state and current Iws becomes 0 A. Accordingly, the three-phase short circuit current is interrupted, thereby attenuating the alternating current of current Ius.

At a subsequent time t2, the state between the first and second electrodes of circuit breaker B11 are brought into the open state and switch S13 of reverse current generation circuit 31 is turned on. When direct current Idcs is flowing in circuit breaker B11, arc is generated between the first and second electrodes and direct current Idcs continues to flow. When switch S13 is turned on, the current reverse to direct current Idcs flows in a path from capacitor 33 via reactor 34, switch S13, and circuit breaker B11. At a time at which current Ius becomes 0 A, the arc is extinguished, whereby circuit breaker B11 is brought into the non-conductive state and short circuit currents Ius, Ivs, Iws become 0 A.

It should be noted that when large direct current Idcs occurs in a phase (for example, V phase) other than the U phase upon a short circuit accident, direct current Idcs is transferred to the U phase at the time at which circuit breakers B12, B13 are brought into the non-conductive state. Therefore, also in this case, by bringing AC circuit breakers B12, B13 into the non-conductive state and then bringing DC circuit breaker B11 into the non-conductive state, the short circuit current can be interrupted.

Figure 10:
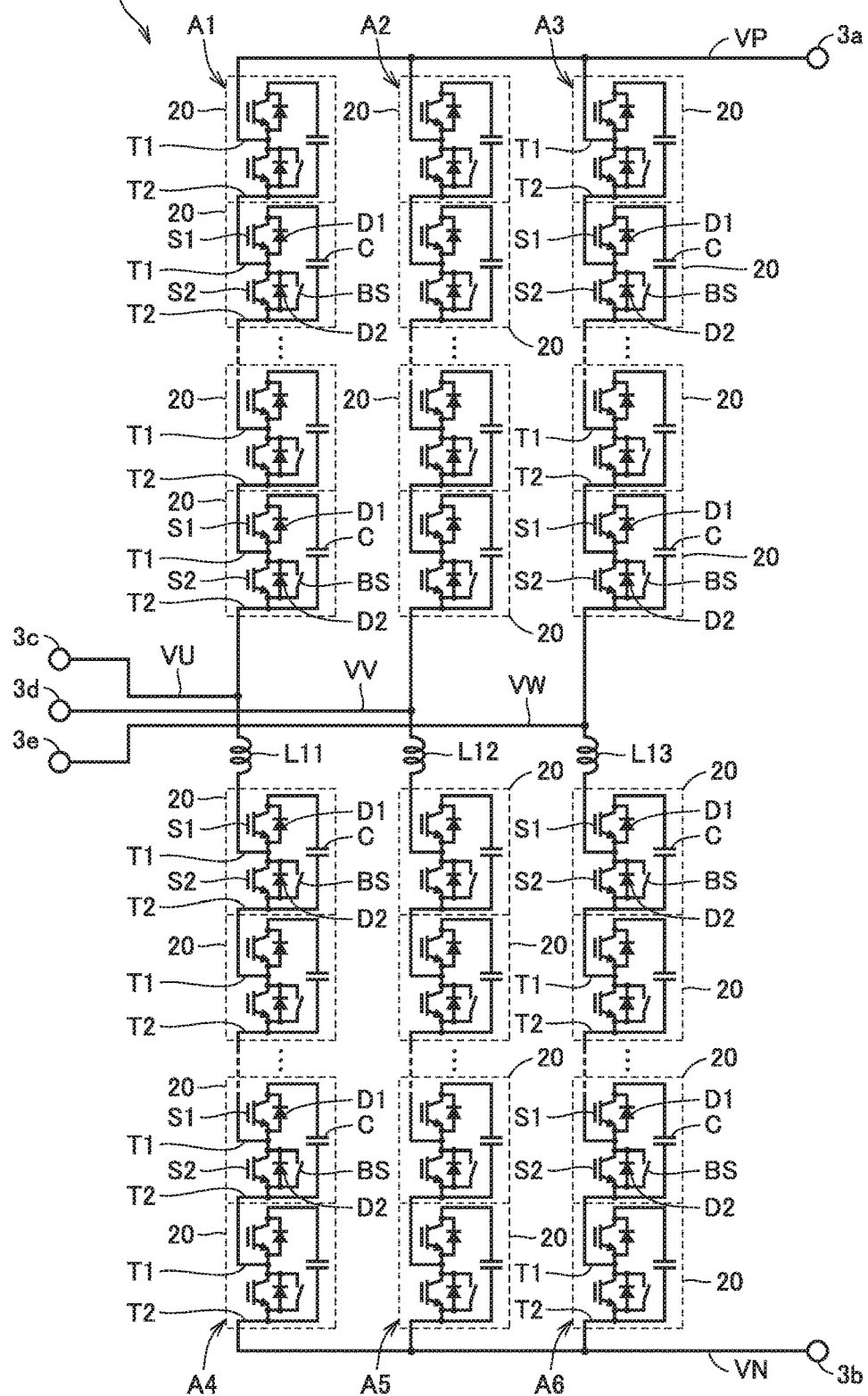
FIG. 10 is a circuit diagram showing a major portion of a multilevel converter included in a DC power transmission system serving as a comparative example for the embodiment.

FIG. 10 is a circuit diagram showing a major portion of a multilevel converter 40 included in a DC power transmission system serving as a comparative example for the present embodiment, and is a diagram compared with FIG. 2. With reference to FIG. 10, multilevel converter 40 is different from multilevel converter 3 of FIG. 2 in that DC interruption device 30 including circuit breaker B11, and circuit breakers B12, B13 are not provided. Arm A1 is connected between positive voltage terminal 3a and AC terminal 3c, arm A2 is connected between positive voltage terminal 3a and AC terminal 3d, and arm A3 is connected between positive voltage terminal 3a and AC terminal 3e.

Figure 11:
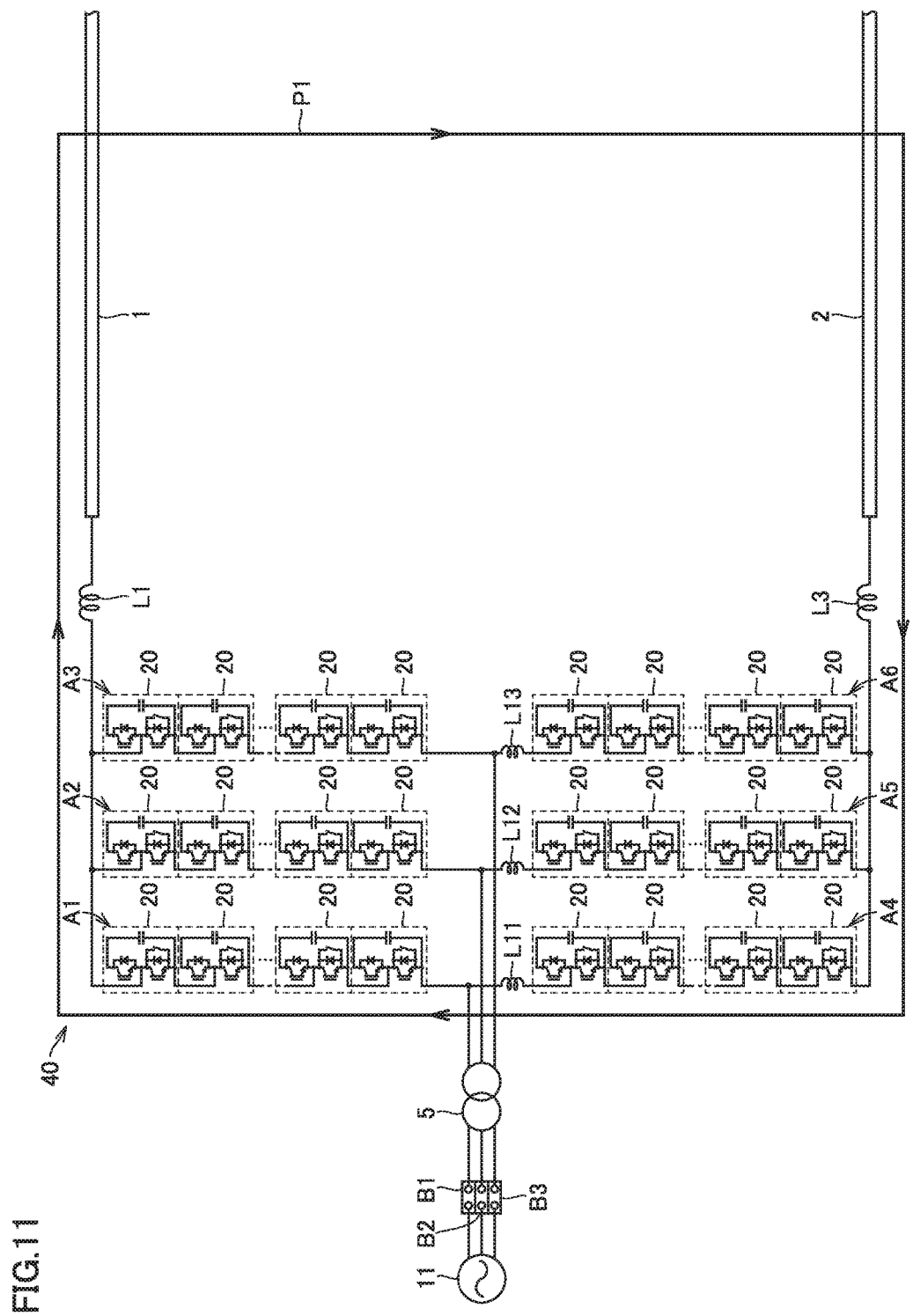
FIG. 11 is a circuit diagram showing line direct current flowing in a DC power transmission system including the multilevel converter shown in FIG. 10 upon occurrence of a short circuit accident.

When a short circuit accident occurs in DC power transmission lines 1, 2 in the DC power transmission system including such a multilevel converter 40, line direct current flows in a path P1 as shown in FIG. 11, for example. That is, the line direct current flows in path P1 including DC power transmission line 1, a short circuit portion (not shown), DC power transmission line 2, reactor L3, arm A4, reactor L11, arm A1, reactor L1, and DC power transmission line 1. The line direct current may flow also in arms A5, A6, reactors L12, L13, and arms A2, A3. Such three-phase short circuit current can be interrupted by bringing circuit breakers B1 to B6 into the non-conductive state. When circuit breakers B1 to B6 are brought into the non-conductive state, supply of power is interrupted, with the result that the line direct current is consumed and attenuated by a resistance component of arc between DC power transmission lines 1, 2.

Figure 12:
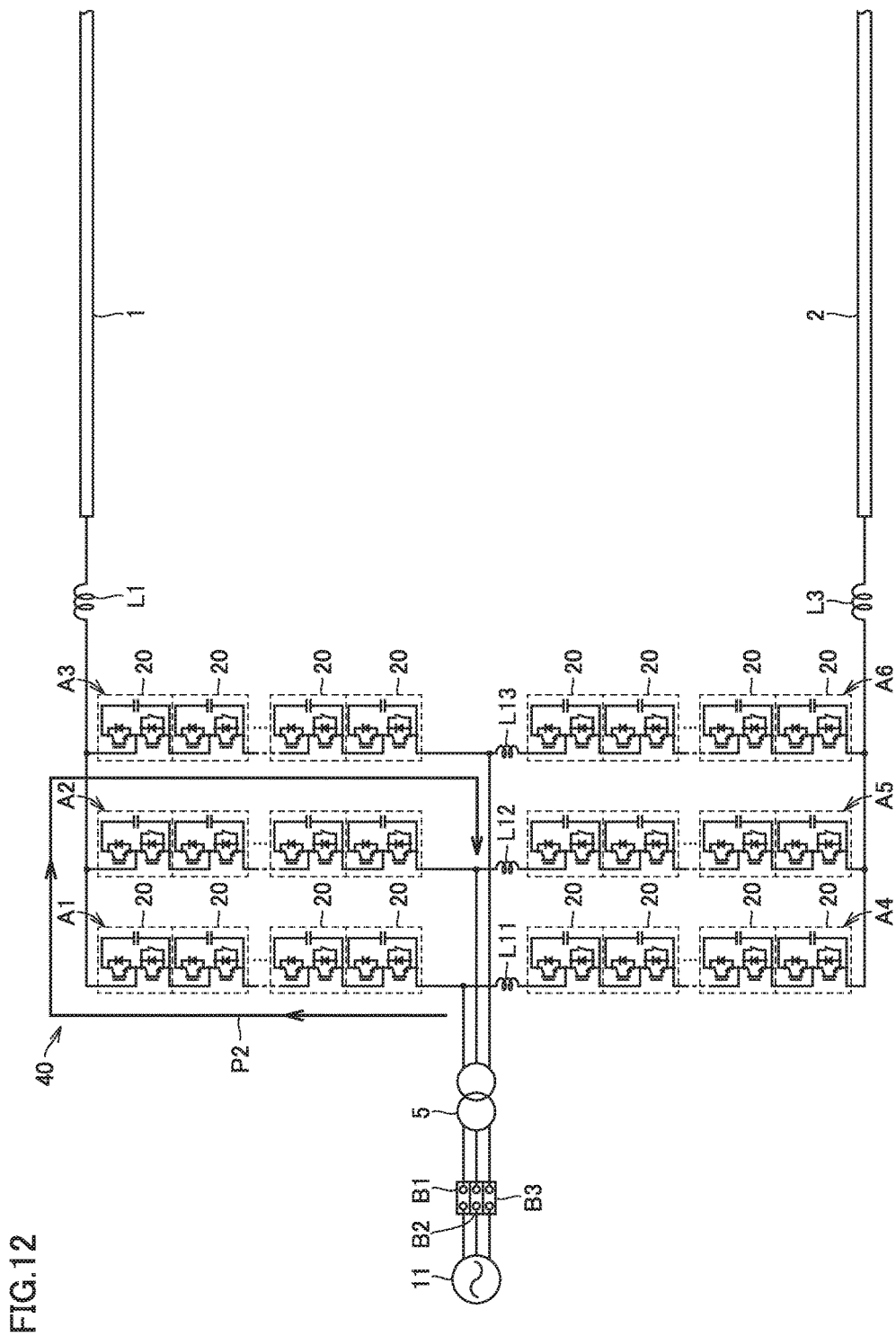
FIG. 12 is a circuit diagram showing three-phase short circuit current flowing in the DC power transmission system including the multilevel converter shown in FIG. 10 upon occurrence of the short circuit accident.

Moreover, when mechanical bypass switch BS of each unit cell 20 is brought into the conductive state, the three secondary terminals of three-phase transformer 5 are short-circuited, with the result that three-phase short circuit current flows in a path P2 as shown in FIG. 12, for example. The three-phase short circuit current flows in path P2 including the U-phase secondary terminal of three-phase transformer 5, arms A1, A2, and the V-phase secondary terminal of three-phase transformer 5, for example. Further, the three-phase short circuit current may flow in a path including the U-phase secondary terminal of three-phase transformer 5, arms A1, A3, and the W-phase secondary terminal of three-phase transformer 5. Such three-phase short circuit current can be interrupted by bringing circuit breakers B1 to B6 into the non-conductive state.

Figure 13:
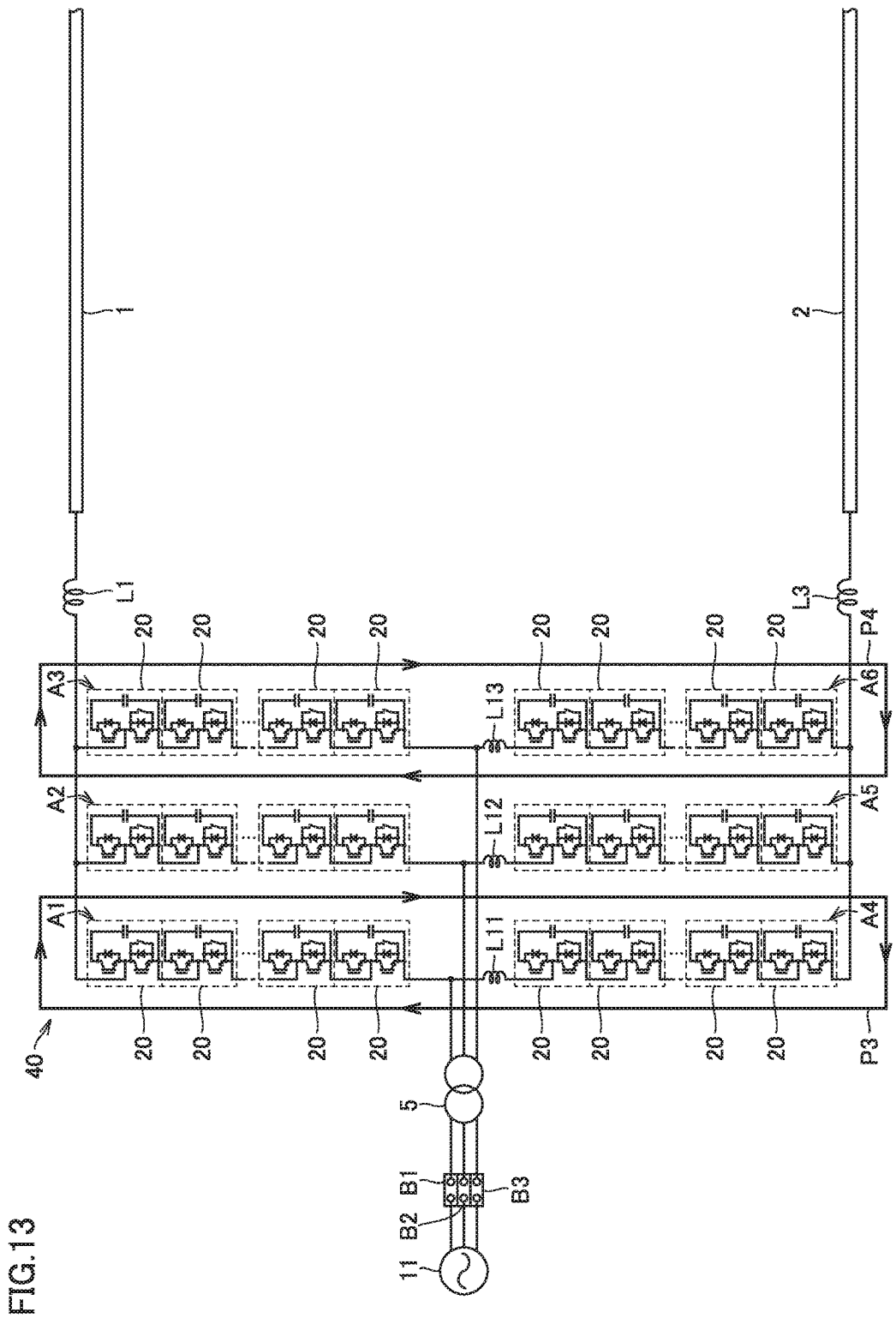
FIG. 13 is a circuit diagram showing inter-arm direct current flowing in the DC power transmission system including the multilevel converter shown in FIG. 10 upon occurrence of the short circuit accident.

Furthermore, when mechanical bypass switch BS of each unit cell 20 is brought into the conductive state, electromagnetic energy accumulated in reactors L11 to L13 is released, with the result that inter-arm direct current is circulated in each of paths P3, P4 as shown in FIG. 13, for example. That is, the inter-arm direct current flows in path P3 including reactor L11, arms A1, A2, reactor L12, and arms A5, A4. The inter-arm direct current flows in path P4 including reactor L12, arms A2, A3, reactor L13, and arms A6, A5.

In multilevel converter 40 of the comparative example, the inter-arm direct current shown in FIG. 13 cannot be interrupted, so that it is necessary to wait for the inter-arm direct current to be attenuated by the resistance component of the circuit. The inter-arm direct current continues to flow in current path P3 while being attenuated at a time constant determined by a ratio of inductance to resistance value of current path P3, for example. In such a DC power transmission system, the resistance component is made small in order to reduce loss, so that the attenuation time constant for the inter-arm direct current is large. Therefore, when a short circuit accident occurs, the DC power transmission system cannot be restarted quickly.

On the other hand, in the present embodiment, circuit breakers B11 to B13 of FIG. 2 are brought into the non-conductive state, thereby quickly interrupting the inter-arm direct current. Therefore, the short circuit current flowing upon the short circuit accident can be interrupted immediately and the DC power transmission system can be restarted quickly.

Figure 14:
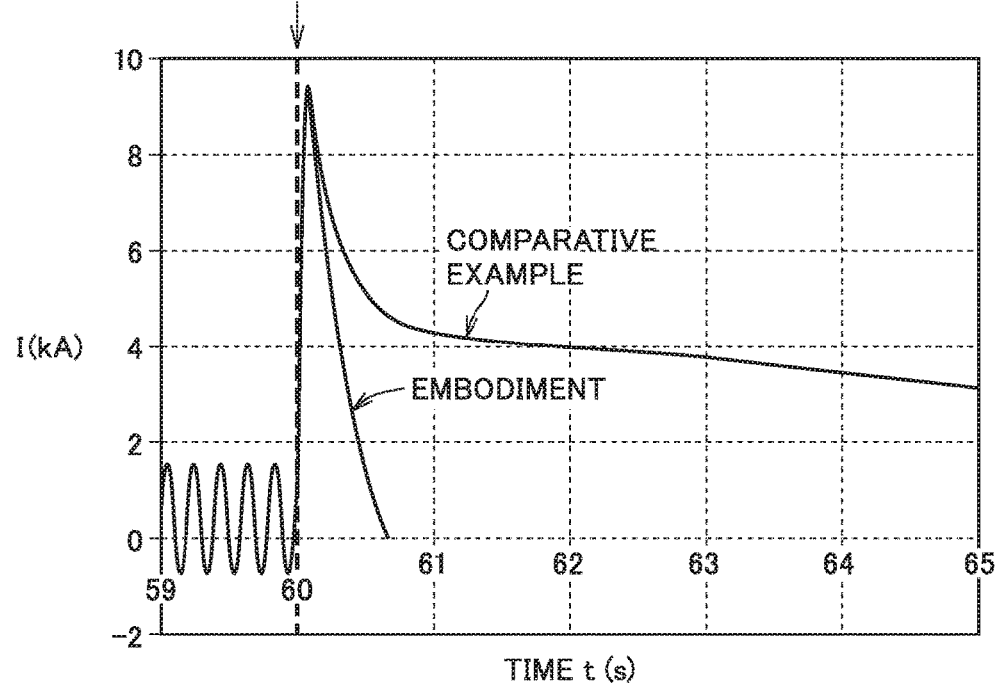
FIG. 14 is a time chart showing the inter-arm direct current in each of the embodiment and the comparative example.

FIG. 14 is a time chart showing a change of inter-arm direct current I with time in each of the embodiment and the comparative example. In FIG. 14, in the comparative example, even 0.5 second after occurrence of a short circuit accident, inter-arm direct current I is decreased only to a value about the half of the peak value. On the other hand, in the present embodiment, 0.5 second after occurrence of a short circuit accident, inter-arm direct current I is decreased to 0 A. Accordingly, according to the present embodiment, the inter-arm direct current flowing upon the occurrence of the short circuit accident can be interrupted immediately, whereby the DC power transmission system can be restarted quickly even when the short circuit accident occurs.

It should be noted that in the present embodiment, circuit breaker B11 is provided between arm A1 and reactor L11; however, the configuration is not limited to this and circuit breaker B11 may be provided in any location between positive voltage terminal 3a and negative voltage terminal 3b. For example, circuit breaker B11 may be connected between reactor L11 and arm A4. Moreover, AC terminal 3c may be connected between arm A1 and circuit breaker B11. The same applies to each of circuit breakers B12, B13.

In the present embodiment, first terminal T1 and second terminal T2 of unit cell 20 are respectively connected to the collector and emitter of switching element S2 and mechanical bypass switch BS is connected to diode D2 in parallel; however, the configuration is not limited to this, and the same result is obtained when first terminal T1 and second terminal T2 of unit cell 20 are respectively connected to the collector and emitter of switching element S1 and mechanical bypass switch BS is connected to diode D1 in parallel.

In the present embodiment, AC terminal 3c (or AC terminal 3d or AC terminal 3e) is connected between two arms A1, A4 (or between two arms A2, A5 or between two arms A3, A6), the AC power transmission line is directly connected to AC terminal 3c (or AC terminal 3d or AC terminal 3e); however, the configuration is not limited to this. Any configuration may be employed as long as AC power can be extracted from arms A1 to A6. For example, the following configuration may be employed: AC power is extracted from arms A1 to A6 via three transformers each having one winding connected between two arms A1, A4 (or between two arms A2, A5 or between two arms A3, A6) and the other winding magnetically coupled to the one winding.

Furthermore, in the present embodiment, mechanical bypass switch BS is provided for each unit cell 20; however, the configuration is not limited to this. One or more mechanical bypass switches BS may be provided for each arm A as long as diodes D1 or D2 of the plurality of unit cells 20 of each arm A can be bypassed. For example, one mechanical bypass switch BS may be connected, in parallel, to the plurality of unit cells 20 included in each arm and connected in series.

Figure 15:
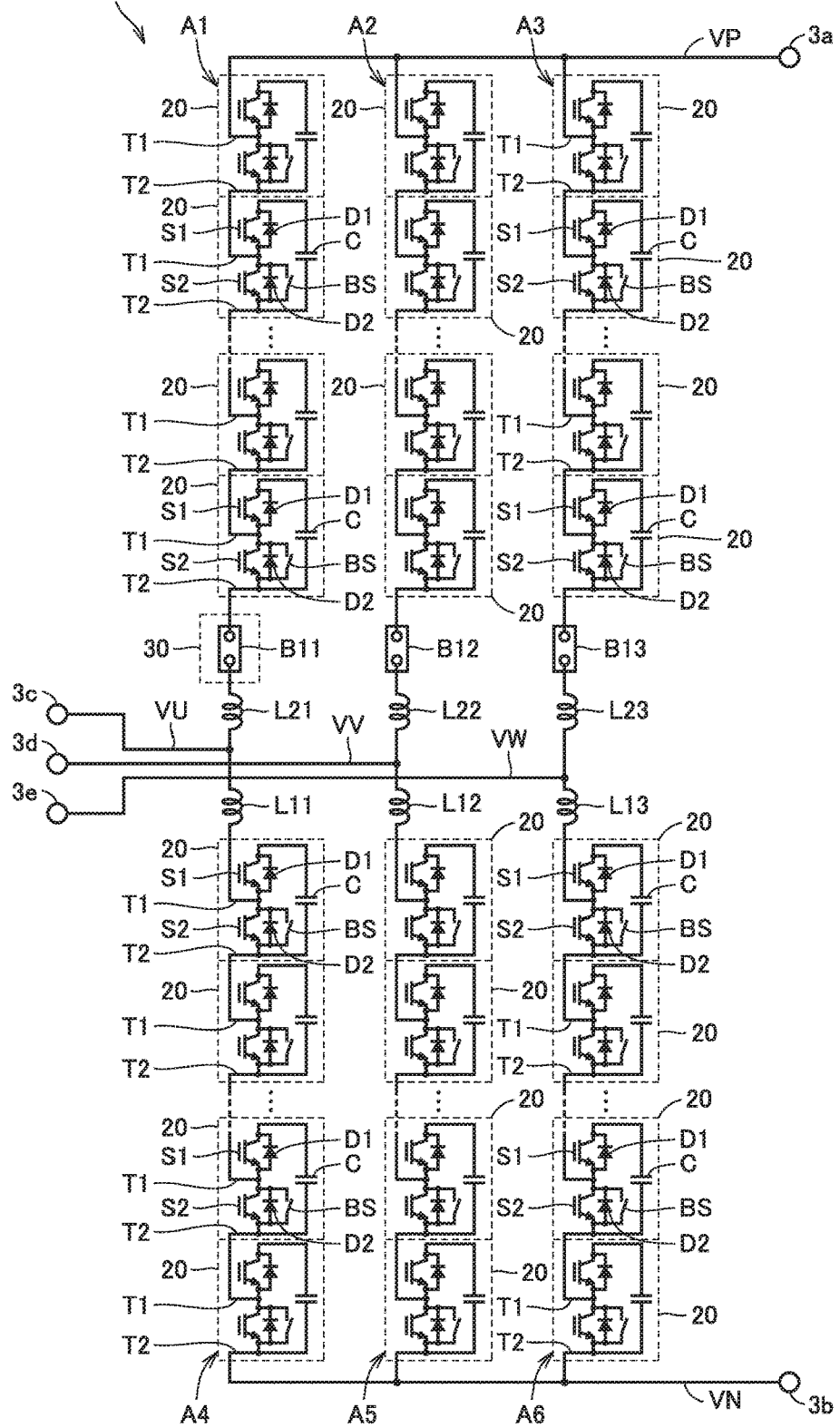
FIG. 15 is a circuit block diagram showing a modification of the embodiment.

FIG. 15 is a circuit diagram showing a configuration of a multilevel converter 45 serving as a modification of the embodiment, and is a diagram compared with FIG. 2. With reference to FIG. 15, this multilevel converter 45 is obtained by adding reactors L21 to L23 to multilevel converter 3 of FIG. 2. Arm A1, circuit breaker B11, and reactor L21 are connected in series between positive voltage terminal 3a and AC terminal 3c. Arm A2, circuit breaker B12, and reactor L22 are connected in series between positive voltage terminal 3a and AC terminal 3d. Arm A3, circuit breaker B13, and reactor L23 are connected in series between positive voltage terminal 3a and AC terminal 3e. Reactors L11 to L13 and L21 to L23 attenuate a signal having a switching frequency and generated in arms A1 to A6, and control three-phase AC current flowing in arms A1 to A6. Also in this modification, the same effect as that in the embodiment is obtained.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST 1, 2: DC power transmission line; B1 to B6, B11 to B13: circuit breaker; L1 to L4, L11 to L13, L21 to L23, 34: reactor; 3, 4, 40, 45: half bridge type modular multilevel converter; 3a, 4a: positive voltage terminal; 3b, 4b: negative voltage terminal; 3c to 3e, 4c to 4e: AC terminal; 5, 6: three-phase transformer; 11, 12: AC power system; A1 to A6: arm; 20: unit cell; T1: first terminal; T2: second terminal; 21: current detector; S1, S2: switching element; D1, D2: diode; BS: mechanical bypass switch; C, 33: capacitor; 22: voltage detector; 23: controller; 30: DC interruption device; 30a, 30b: terminal; 31: reverse current generation circuit; 32: charger; S11 to S13: switch.

The invention claimed is:

1. A power converter comprising:
first and second DC terminals each configured to transmit and receive DC power, the first DC terminal being connected to a first DC power transmission line, the second DC terminal being connected to a second DC power transmission line; and
a plurality of phase modules connected in parallel between the first and second DC terminals,
each of the phase modules including
an AC terminal configured to transmit and receive AC power,
a first arm and a circuit breaker connected in series between the first DC terminal and the AC terminal, and
a second arm connected between the AC terminal and the second DC terminal,
the circuit breaker being configured to be in a conductive state during a normal operation, the circuit breaker being configured to be brought into a non-conductive state when a short circuit accident occurs between the first and second DC power transmission lines,
each of the first and second arms including a plurality of unit cells connected in cascade,
each of the unit cells including a voltage source, first and second switching elements, and first and second diodes, the first and second switching elements being connected in series between electrodes of the voltage source, the first and second diodes being respectively connected to the first and second switching elements in antiparallel,
each of the first and second arms further including at least one bypass switch,
the at least one bypass switch being configured to be brought into the conductive state when the short circuit accident occurs, so as to bypass the first or second diode of each unit cell of a corresponding arm,
one of the plurality of circuit breakers being a DC circuit breaker configured to interrupt direct current when the short circuit accident occurs, each of the other circuit breakers being an AC circuit breaker configured to interrupt alternating current when the short circuit accident occurs.

2. The power converter according to claim 1, wherein when the short circuit accident occurs, the each AC circuit breaker is brought into the non-conductive state and the DC circuit breaker is then brought into the non-conductive state.

3. The power converter according to claim 1, further comprising a reverse current generation circuit configured to supply the DC circuit breaker with current reverse to the direct current during an interruption operation of causing the DC circuit breaker to interrupt.

4. The power converter according to claim 3, further comprising an energy absorption element configured to attenuate overvoltage generated between terminals of the DC circuit breaker when causing the DC circuit breaker to interrupt.

5. The power converter according to claim 1, wherein
each of the phase modules further includes a reactor configured to control current, and
the reactor and the second arm are connected in series between the AC terminal and the second DC terminal.

6. The power converter according to claim 1, wherein
each of the phase modules further includes first and second reactors each configured to control current,
the first arm, the circuit breaker, and the first reactor are connected in series between the first DC terminal and the AC terminal, and
the second reactor and the second arm are connected in series between the AC terminal and the second DC terminal.

7. The power converter according to claim 1, further comprising:
a plurality of current detectors each provided for a corresponding one of the plurality of phase modules, each of the plurality of current detectors being configured to detect current flowing in the first and second arms of the corresponding phase module; and a controller configured to determine, based on a result of detection by each of the plurality of current detectors, whether or not the short circuit accident has occurred, and to control each unit cell, each bypass switch, and each circuit breaker based on a result of determination.

8. The power converter according to claim 1, wherein the power converter has
   a first power conversion mode in which multiple-phase AC power received by the plurality of AC terminals is converted into DC power and the DC power is supplied to the first and second DC terminals, and
   a second power conversion mode in which DC power received by the first and second DC terminals is converted into multiple-phase AC power and the multiple-phase AC power is supplied to the plurality of AC terminals.

9. A power converter comprising:
   first and second DC terminals each configured to transmit and receive DC power, the first DC terminal being connected to a first DC power transmission line, the second DC terminal being connected to a second DC power transmission line; and
   a plurality of phase modules connected in parallel between the first and second DC terminals,
   each of the phase modules including
      an AC terminal configured to transmit and receive AC power,
      a first arm and a circuit breaker connected in series between the first DC terminal and the AC terminal, and
      a second arm connected between the AC terminal and the second DC terminal,
   the circuit breaker being configured to be in a conductive state during a normal operation, the circuit breaker being configured to be brought into a non-conductive state when a short circuit accident occurs between the first and second DC power transmission lines,
   each of the first and second arms including a plurality of unit cells connected in cascade,
   each of the unit cells including a voltage source, first and second switching elements, and first and second diodes, the first and second switching elements being connected in series between electrodes of the voltage source, the first and second diodes being respectively connected to the first and second switching elements in antiparallel,
   each of the first and second arms further including at least one bypass switch,
   the at least one bypass switch being configured to be in the non-conductive state during the normal operation, the at least one bypass switch being configured to be brought into the conductive state when the short circuit accident occurs, so as to bypass the first or second diode of each unit cell of a corresponding arm,
   when the short circuit accident occurs, a circuit breaker having a highest capability to interrupt direct current among the plurality of circuit breakers being finally caused to interrupt.

10. The power converter according to claim 9, wherein
   each of the phase modules further includes a reactor configured to control current, and
   the reactor and the second arm are connected in series between the AC terminal and the second DC terminal.

11. The power converter according to claim 9, wherein
   each of the phase modules further includes first and second reactors each configured to control current,
   the first arm, the circuit breaker, and the first reactor are connected in series between the first DC terminal and the AC terminal, and
   the second reactor and the second arm are connected in series between the AC terminal and the second DC terminal.

12. The power converter according to claim 9, further comprising:
   a plurality of current detectors each provided for a corresponding one of the plurality of phase modules, each of the plurality of current detectors being configured to detect current flowing in the first and second arms of the corresponding phase module; and
   a controller configured to determine, based on a result of detection by each of the plurality of current detectors, whether or not the short circuit accident has occurred, and to control each unit cell, each bypass switch, and each circuit breaker based on a result of determination.

13. The power converter according to claim 9, wherein the power converter has
   a first power conversion mode in which multiple-phase AC power received by the plurality of AC terminals is converted into DC power and the DC power is supplied to the first and second DC terminals, and
   a second power conversion mode in which DC power received by the first and second DC terminals is converted into multiple-phase AC power and the multiple-phase AC power is supplied to the plurality of AC terminals.

\* \* \* \* \*